United States Patent
Kapusky et al.

(10) Patent No.: US 10,759,318 B2
(45) Date of Patent: Sep. 1, 2020

(54) INFINITE ADJUSTMENT MECHANISM FOR A HEAD RESTRAINT

(71) Applicant: Adient Luxembourg Holding S.á r.l., Luxembourg (LU)

(72) Inventors: Michael Kapusky, South Lyon, MI (US); Eric Michalak, Canton, MI (US); Nathan Caruss, Ann Arbor, MI (US); Jennifer Carlson, Ypsilanti, MI (US); Brent Burton, Windsor (CA); Matthew McClelland, Trenton, MI (US)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/326,093

(22) PCT Filed: Jul. 25, 2017

(86) PCT No.: PCT/US2017/043620
§ 371 (c)(1),
(2) Date: Feb. 15, 2019

(87) PCT Pub. No.: WO2018/034803
PCT Pub. Date: Feb. 22, 2018

(65) Prior Publication Data
US 2019/0210501 A1  Jul. 11, 2019

Related U.S. Application Data

(60) Provisional application No. 62/377,093, filed on Aug. 19, 2016.

(51) Int. Cl.
*B60R 21/055* (2006.01)
*A47C 7/38* (2006.01)
(Continued)

(52) U.S. Cl.
CPC ............. *B60N 2/888* (2018.02); *B60N 2/806* (2018.02); *B60N 2/815* (2018.02); *B60N 2/824* (2018.02);
(Continued)

(58) Field of Classification Search
CPC ........ B60N 2/818; B60N 2/809; B60N 2/815; B60N 2/829; B60N 2/806; B60N 2/80; B60N 2/812; B60N 2/891
See application file for complete search history.

(56) References Cited

U.S. PATENT DOCUMENTS

| 3,874,480 A | 4/1975 | Porter et al. |
| 4,411,339 A | 10/1983 | Porter |

(Continued)

FOREIGN PATENT DOCUMENTS

| DE | 102007048151 B3 | 1/2009 |
| WO | 2015/175655 A1 | 11/2015 |
| WO | 2015175655 A1 | 11/2015 |

OTHER PUBLICATIONS

European Patent Office, Supplementary European Search Report and Written Opinion in application No. EP 17841829 dated Mar. 17, 2020, 7 pages, Munich, Germany.

*Primary Examiner* — Shin H Kim
(74) *Attorney, Agent, or Firm* — Marshall & Melhorn, LLC

(57) ABSTRACT

A head restraint for a seat being adjustable in a vertical direction, and angularly adjustable with regard to lateral portions of the head restraint. A mechanism providing this adjustability is a linear and rotational locking mechanism with a shaft and a slide. The slide is selectively slidably and (Continued)

rotatably mounted on the shaft. The slide has a locked state which linearly and rotationally fixes the slide on, and with respect to, the shaft. The slide has a release state where the slide is linearly and rotatably movable on the shaft. The slide is fixable in a plurality of linear and rotational positions on the shaft in the locked state. The number of linear and rotational positions on the shaft is considered infinite since for all practical purposes, the slide is not restricted to individual discrete positions, but is continuously adjustable to practically any linear and rotational position.

14 Claims, 15 Drawing Sheets

(51) Int. Cl.
- *B60N 2/888* (2018.01)
- *F16B 7/14* (2006.01)
- *B60N 2/824* (2018.01)
- *B60N 2/885* (2018.01)
- *B60N 2/815* (2018.01)
- *B60N 2/806* (2018.01)
- *B60N 2/90* (2018.01)

(52) U.S. Cl.
CPC ............. *B60N 2/885* (2018.02); *B60N 2/938* (2018.02); *F16B 7/14* (2013.01)

(56) References Cited

U.S. PATENT DOCUMENTS

| | | |
|---|---|---|
| 4,425,987 A | 1/1984 | Porter |
| 4,457,406 A | 7/1984 | Porter |
| 4,577,730 A | 3/1986 | Porter |
| 4,880,084 A | 11/1989 | Tanaka et al. |
| 5,150,771 A | 9/1992 | Porter |
| 5,157,826 A | 10/1992 | Porter et al. |
| 5,219,045 A | 6/1993 | Porter et al. |
| 5,441,129 A | 8/1995 | Porter et al. |
| 5,568,843 A | 10/1996 | Porter et al. |
| 5,794,470 A | 8/1998 | Stringer |
| 6,550,856 B1 * | 4/2003 | Ganser ............... B60N 2/20 297/61 |
| 6,666,517 B2 * | 12/2003 | Clough ............... B60N 2/885 297/410 |
| 7,264,313 B2 * | 9/2007 | Clough ............... A47C 7/38 297/407 |
| 8,038,220 B2 | 10/2011 | Liu et al. |
| 8,066,329 B2 * | 11/2011 | Liu ............... B60N 2/879 297/407 |
| 8,303,039 B2 | 11/2012 | Mueller et al. |
| 8,348,347 B2 | 1/2013 | Willard et al. |
| 2002/0158499 A1 * | 10/2002 | Clough ............... B60N 2/885 297/410 |
| 2012/0126605 A1 | 5/2012 | Gross et al. |
| 2014/0001811 A1 | 1/2014 | Haeske et al. |
| 2015/0183347 A1 | 7/2015 | Falster et al. |

\* cited by examiner

INFINITE ADJUSTMENT MECHANISM FOR A HEAD RESTRAINT

CROSS REFERENCE TO RELATED APPLICATIONS

This application claims the benefit of priority of U.S. provisional application 62/377,093 filed Aug. 19, 2016, the entire contents of which are incorporated herein by reference.

FIELD OF THE INVENTION

The present invention relates generally to adjustment mechanisms for head restraints, and in particular to a head restraint which is movable vertically and has pivotal portions.

BACKGROUND OF THE INVENTION

Head restraints, which may be located on the top of a seat, may have a mechanism, release, or control, such as a push-button, to release or unlock the head restraint in order for the head restraint height (vertical position relative to the seat) to be adjusted. Typically, the control is located away from the head restraint itself. Thus, in order to raise or lower the head restraint, the user must push or activate the control with one hand while moving the head restraint with the other hand, thus requiring the user to use two hands, and further resulting in uncomfortable and difficult head restraint adjustment. Further, in order to minimize the amount of "buzz, squeak, rattle" (BSR) and "noise, vibration, harshness" (NVH), and since the locking mechanism alone may not be sufficient to sufficiently reduce BSR and NVH, the sliding friction to move the head restraint may be relatively high. Therefore, the control and the head restraint may require a significant amount of effort and force to activate and to move, respectively, further reinforcing the need to use both hands to adjust the head restraint.

Additionally, the contours of such a head restraint, typically are not adjustable. Often, the head restraint will have a static outer shape.

PCT patent document WO 2015/175655 having a priority date of 14 May 2014 and a publication date of 19 Nov. 2015 describes a head restraint which is adjustable and is incorporated by reference. The device in this document has disadvantages in that the positions for adjustment are limited and require relatively large efforts to switch between locking the head restraint and releasing the head restraint.

SUMMARY OF THE INVENTION

The present invention is a head restraint assembly for a seat that is adjustable both in a basically vertical direction, and it is also angularly adjustable with regard to lateral portions or wings of the head restraint. One of the mechanisms providing this adjustability is a linear and rotational locking mechanism with a shaft and a slide. The slide is selectively slidably and rotatably mounted on the shaft. The slide has a locked state which linearly and rotationally fixes the slide on, and with respect to, the shaft. The slide has a release state where the slide is linearly and rotatably movable on the shaft. The slide is fixable in a plurality of linear and rotational positions on the shaft in the locked state. The number of linear and rotational positions on the shaft is considered infinite since for all practical purposes, the slide is not restricted to individual discrete positions, but is continuously adjustable to practically any linear and rotational position in the range of movement.

An attachment device on the slide of the locking mechanism mounts the head restraint assembly to a portion of the seat, the floor, or a part the vehicle.

Head restraint lateral portion(s), also sometimes called wings, are mounted on the shaft of the locking mechanism. The head restraint lateral portions, the shaft, the slide, and the attachment device are arranged to position the head restraint in a head area of an occupant of the seat. The locking mechanism fixes the head restraint lateral portions into a plurality of linear and rotational positions with respect to the seat in the head area of the occupant.

The rotation of the slide is around or about an axial direction of the shaft, and the linear movement of the slide is along the axial direction of the shaft. This axial direction of the shaft is arranged preferably vertically, or substantially close to vertical, or substantially parallel to an axial direction of the seat back, in order to provide comfort to the occupant, and ease in manufacturing and repair.

A particular linear and rotational locking mechanism has a shaft and a slide housing, where the slide and shaft provide sufficient support for a head restraint, and also have a locking state sufficient to resist typical and normal forces encountered for a head restraint, while being continuously/infinitely adjustable in a plurality of rotational and linear positions. This particular locking mechanism offers continuous/infinite adjustment because it uses the forces created from torsional springs working in tandem with two bushings to lock on a solid shaft. These locking mechanisms are primarily useful for locking in linear directions, and only lock in one rotational direction.

The use of this particular locking mechanism has been found to be beneficial in a head restraint, because it can provide both the linear/vertical movement of the entire head restraint, and the rotational/angular movement of the lateral portions/wings of the head restraint. To address the feature of rotationally locking in only one direction, a synchronization mechanism is provided to connect the two lateral portions of the head restraint. The synchronization mechanism synchronizes the rotation of one lateral portion with the other lateral portion. This is so both lateral portions rotate in unison. One locking mechanism can be used to support movement for each lateral portion. The locking mechanisms are arranged with the synchronization mechanism so that one locking mechanism is used to lock one direction of rotational movement, and the other locking mechanism is used to lock the other direction of rotational movement.

Another embodiment uses only a single locking mechanism. Head restraints often only need to restrict rearward or lateral movement of the head of the occupant. This embodiment of the present invention arranges the locking mechanism so that this rearward/lateral movement is lockable. Forward angular movement, or angular movement bringing the lateral portions closer together, is not locked. This forward/closer angular movement can be done even when the locking mechanism is in the locked state, and does not require that the operator contact the user interface for the locking mechanism. The user manually moves the lateral portions forward without any need to operate the user interface. This reduces the effort on the part of the user. This is beneficial in that it uses less components, and is easier for the occupant to use.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
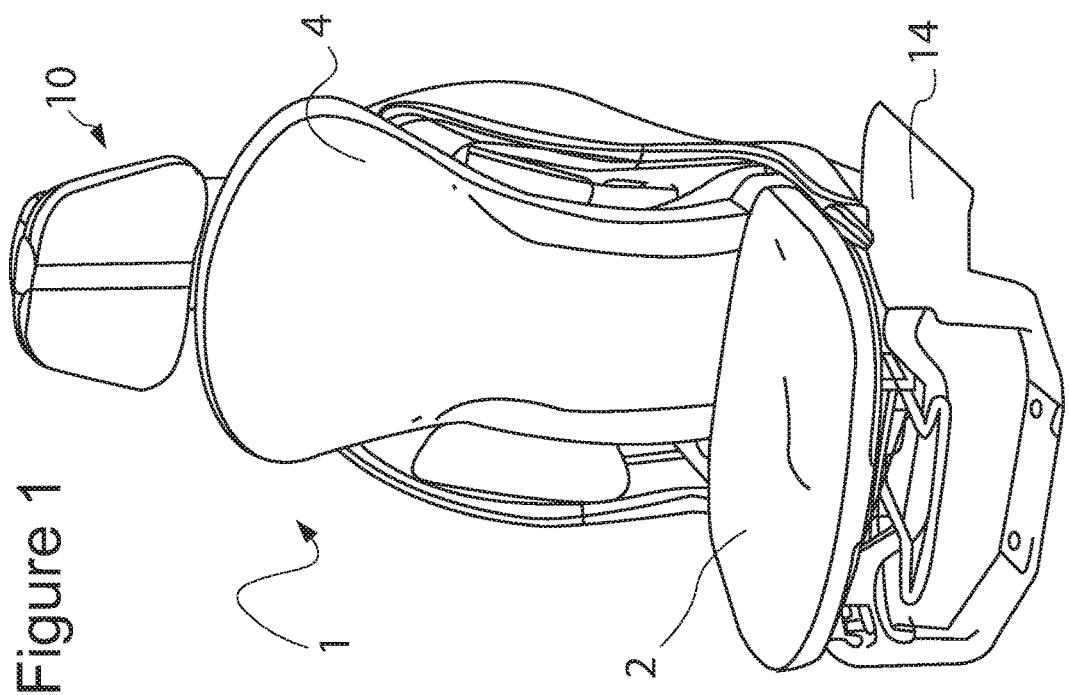
FIG. 1 is a perspective view of a seat that can be disposed in a vehicle.
Figure 2:
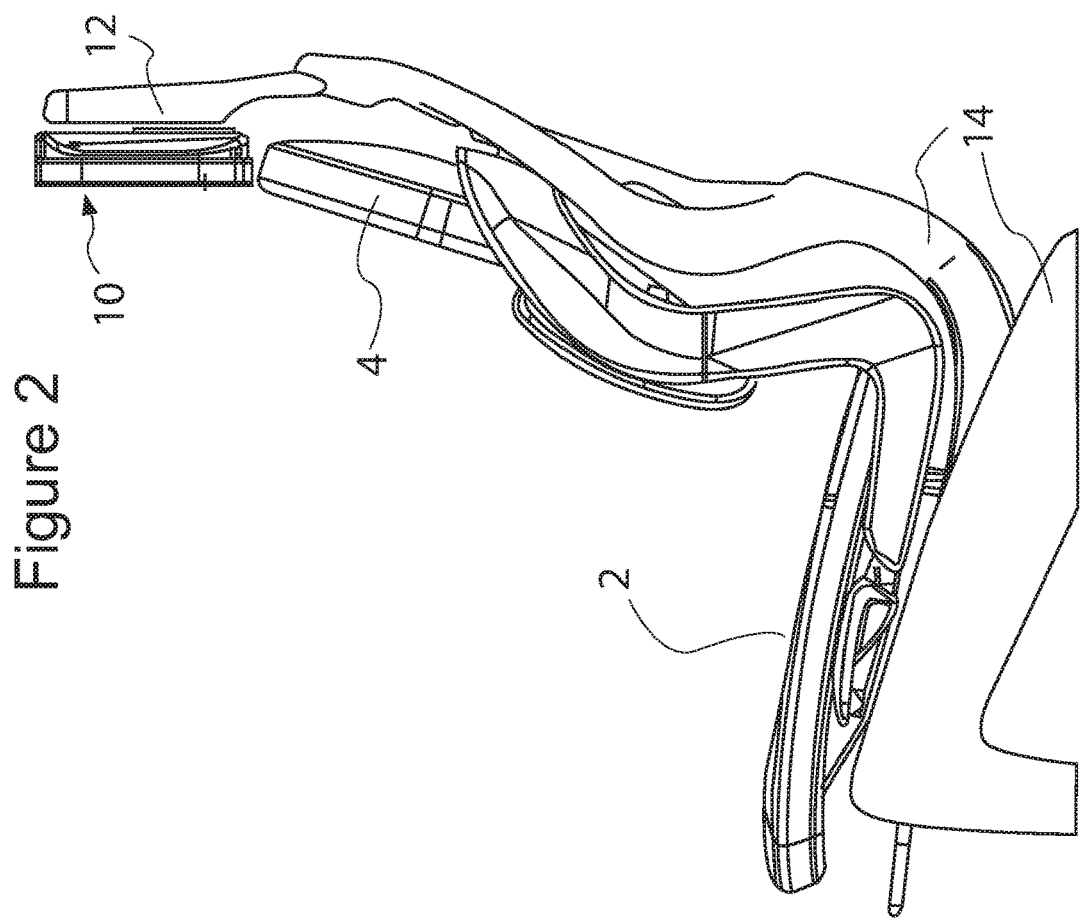
FIG. 2 is a side view of a vehicle seat that can be disposed in a vehicle.

Referring to the drawings in particular, the seat 1 includes a seat cushion 2, a seat back 4, and a head restraint or headrest 10. All of these components are directly or indirectly connected to the vehicle through mounts 14. The head restraint 10 is movably mounted on a support 12 which is connected to the mounts 14.

The head restraint 10 includes an adjustment mechanism with at least one of a vertical adjustment and a contour, or wing/lateral portion, adjustment in order to adjust the vertical position and/or the contour or wing/lateral portion position of a frame, or head restraint portion, 31 (shown in FIG. 3) of the head rest 10. The vertical adjustment allows the vertical position or height of the frame 31 to be adjusted relative to the seat back 4. The contour adjustment allows the curvature or contour of the frame 31 to be adjusted.

The frame 31 may include trim, foam, padding, and/or other protective or decorative members. A front side of the frame 31 may be configured to support and/or contact a head of a passenger/seat occupant. A back side of the frame 31 may be configured to attach to a portion of the seat 1, such as a seat support 12.

The frame 31 includes a center portion 35, a first lateral side portion, or wing, 32, and a second lateral side portion, or wing, 33 that are adjustable relative to the center portion 35 and to each other substantially about, or symmetrical with a center axis 36. The center axis 36 may be substantially vertical (e.g., extending along the z-axis) and disposed substantially at the middle or a center portion of the frame 31 for equal adjustment of the first and second lateral portions 32 and 33, and a smaller overall package of the frame 31. The center axis 36 can also be somewhat parallel to the plane of the seat back 4 so that it provides better comfort to the occupant.

Figure 3:
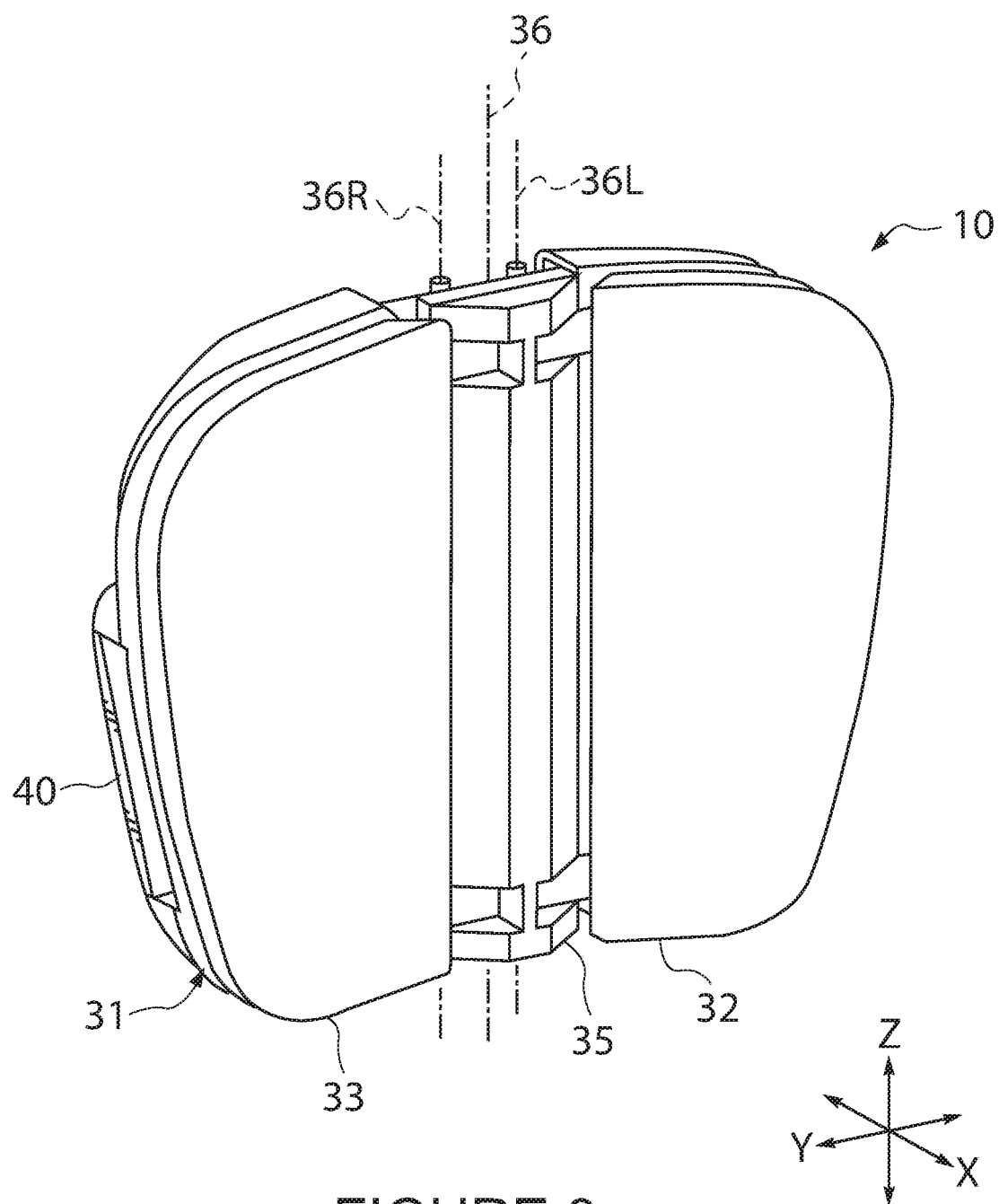
FIG. 3 is a perspective view of a head restraint.

As shown in FIG. 3, while the first and second wings/lateral portions 32 and 33 pivot substantially about/symmetrical to the center axis 36, their precise pivot axes can be slightly offset from the center axis 36. In particular, the first lateral portion 32 can pivot about axis 36L, and the second lateral portion 33 can pivot about axis 36R. This slight offset of the pivot axes 36L and 36R can allow the frame 31 to include the center portion 35 that is positioned between the first and second lateral portions 32 and 33. The center portion 35 may provide additional support and/or an attachment area for the first and second lateral portions 32 and 33.

Figure 5:
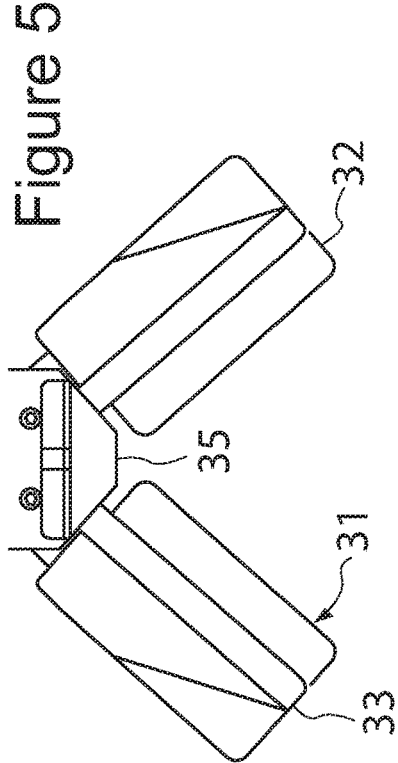
FIG. 5 is a top view of a head restraint in another pivotal or contour position.
Figure 4:
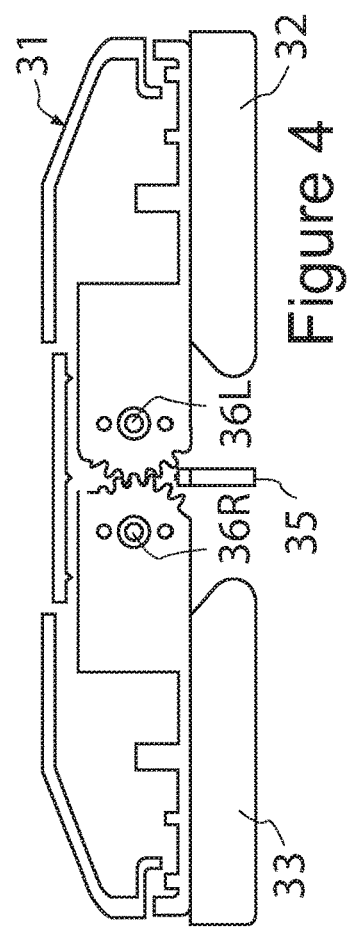
FIG. 4 is a top sectional view of a head restraint in one pivotal or contour position.
Figure 6:
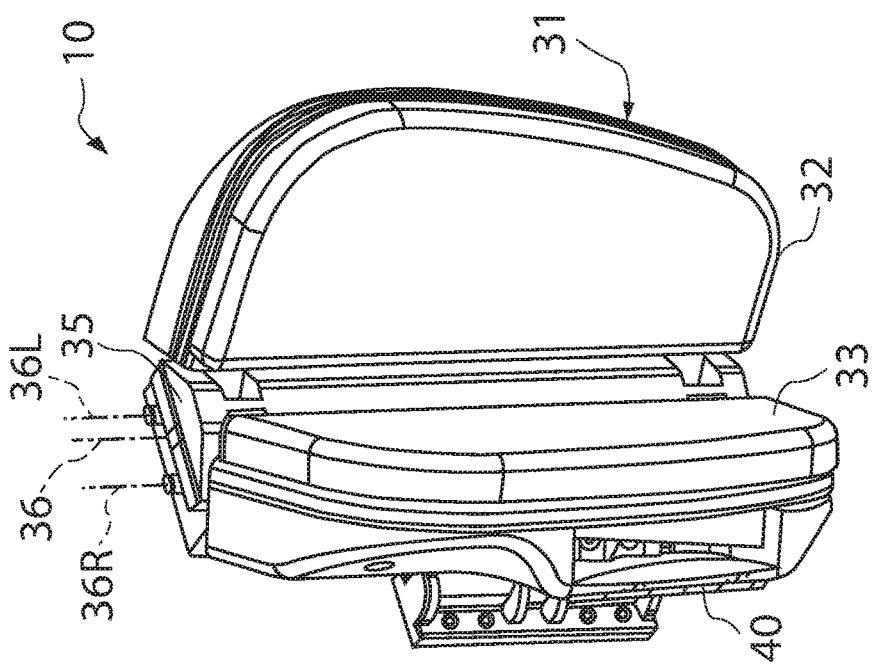
FIG. 6 is a perspective view of the head restraint in the pivotal or contour position of FIG. 5.

The head restraint 10 and the first and second lateral portions 32 and 33 are shown in FIG. 4 in the flat or rearward position. In FIG. 5, the head restraint 10, and the first and second lateral portions 32 and 33 are shown at an angle of less than 180° between each other, or in a more forward position. The forward or angled position shown in FIG. 5 is beneficial for at least two reasons. One reason is that the angled position helps to prevent left and right, or lateral, movement of the occupant's head. Another reason is that depending on the angle of the lateral portions 32 and 33, the head of the occupant can be positioned adjustable in the fore and aft direction. When the lateral portions 32 and 33 are in the flat or rearward position, the head is positioned as far back as it can go. As the lateral portions 32 and 33 are angularly moved closer and closer together, the position of the head moves forward as the space between the lateral portions 32 and 33 becomes smaller in the area of the center portion 35. This places the contact between the head and the head restraint 10 further forward.

Figure 7A:
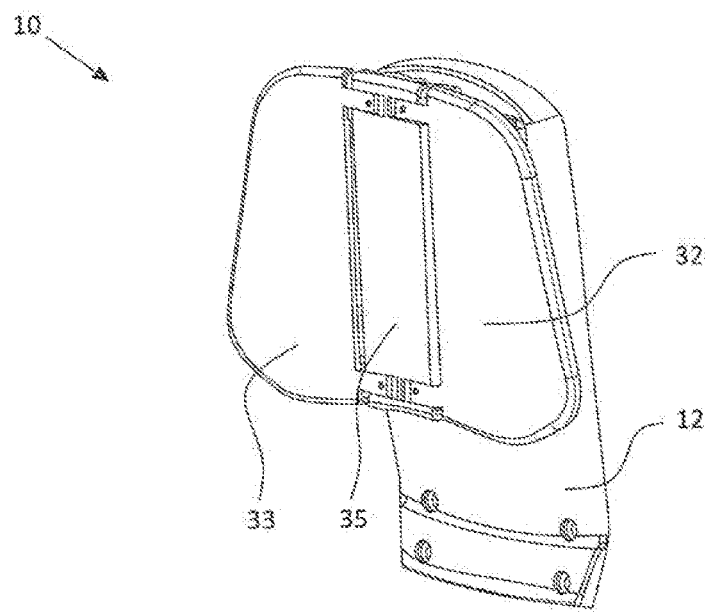
FIG. 7A is a perspective view of the head restraint mounted on a support in the pivotal or contour position of FIG. 4, and in a lowered vertical position.
Figure 8A:
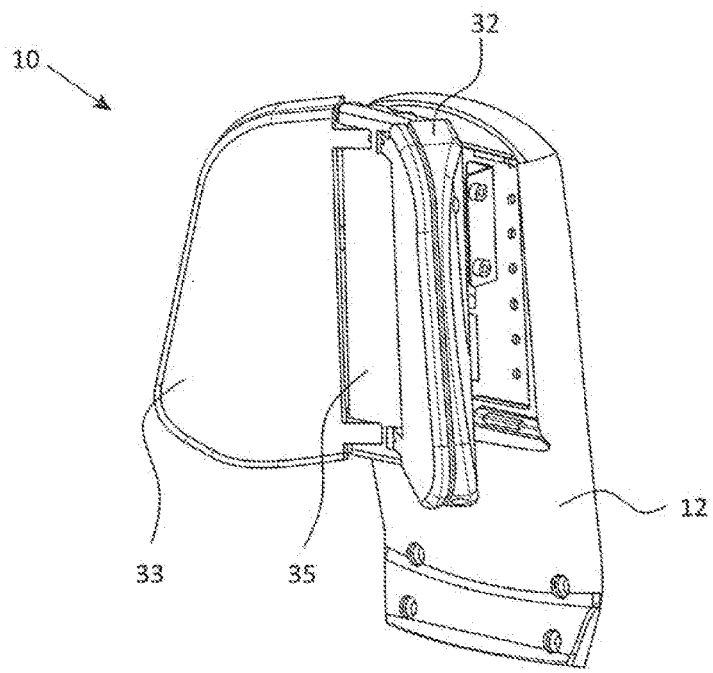
FIG. 8A is a perspective view of the head restraint mounted on a support in the pivotal or contour position of FIG. 5, and in a lowered vertical position.
Figure 9A:
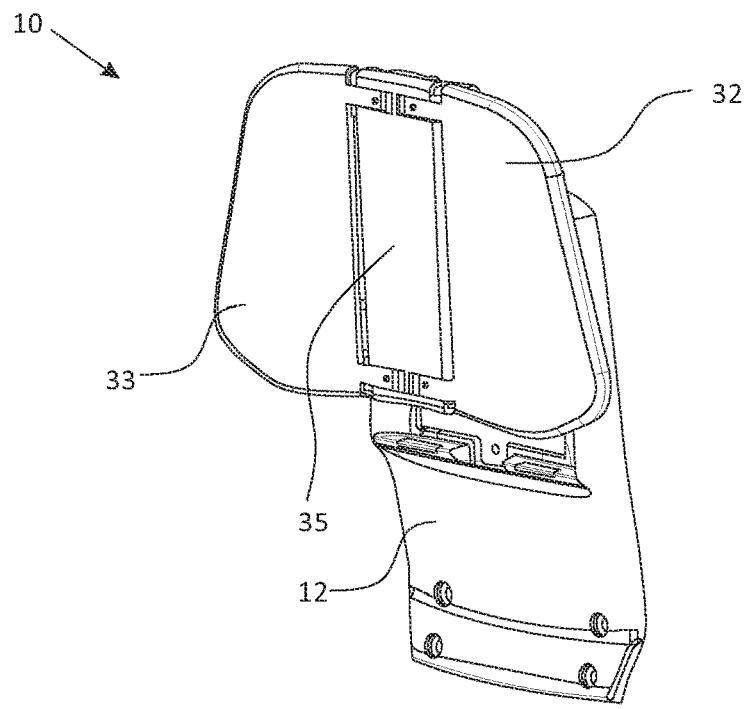
FIG. 9A is a perspective view of the head restraint mounted on a support in the pivotal or contour position of FIG. 4, and in a raised vertical position.

In addition to the lateral portions 32 and 33 moving from a flat to an angular position as shown in FIGS. 7A and 8A, is also desirable for the head restraint 10 to be able to move linearly along the axis 36. The head restraint 10 can position the axis of the shaft 36 in a predominately vertical position for vertical linear movement, i.e. up-and-down. The head restraint 10 can also be arranged to have the axis of the shaft 36 be along a predominately axial position of the seat back 4 of the seat 1, if that would be more comfortable for the occupant. In FIGS. 7A and 8A, the head restraint 10 is in a lower, or lowest, position. In FIG. 9A, the head restraint 10 is in an upper, or highest, position, especially with respect to the support 12. The height of the head restraint is preferably infinitely, or continuously, adjustable to any position between the lowest and the highest position. Likewise the lateral portions 32 and 33 are preferably infinitely angularly adjustable between the flat rearward position and a smallest angled/forward position.

Figure 7B:
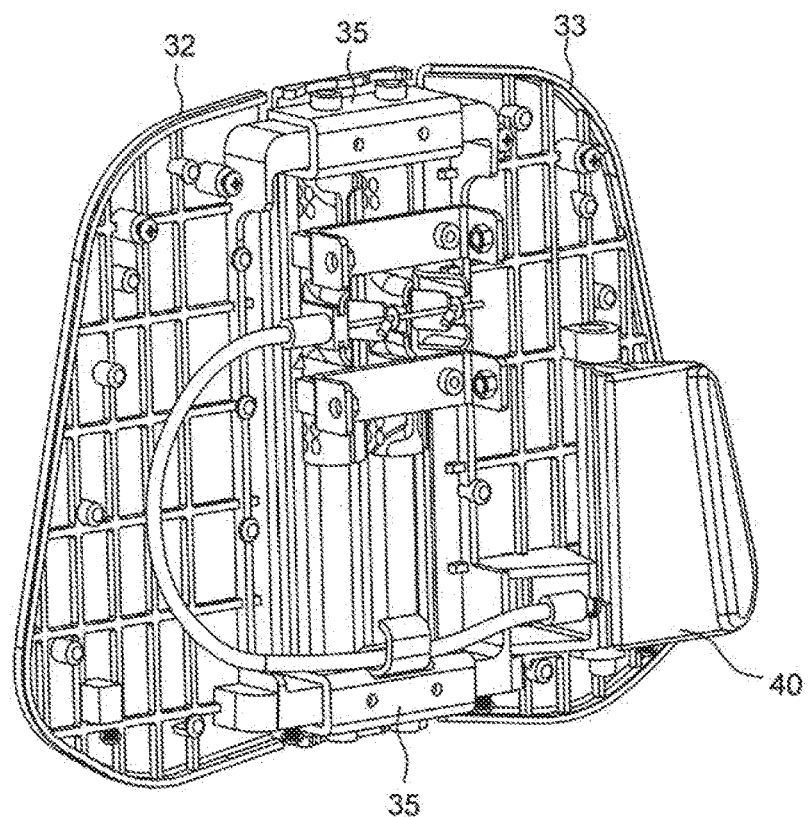
FIG. 7B is a back view of the head restraint in the position of FIG. 7A without the support.
Figure 8B:
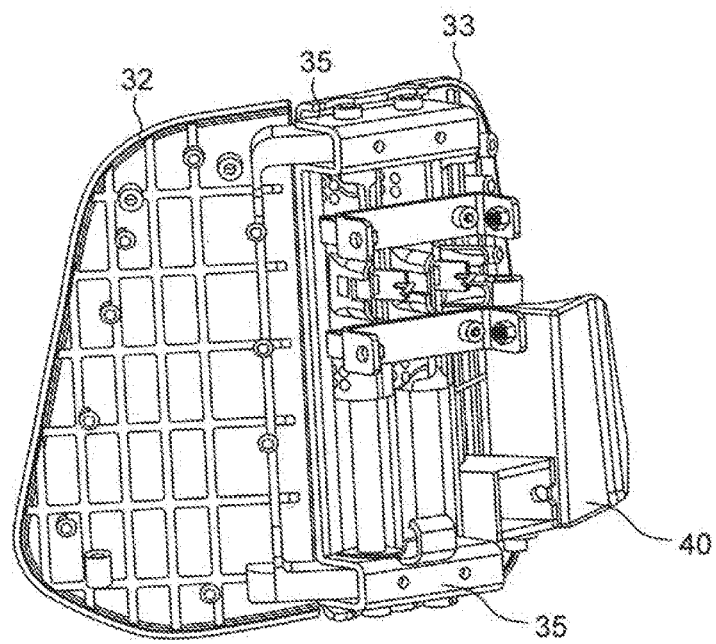
FIG. 8B is a back view of the head restraint in the position of FIG. 8A without the support.
Figure 9B:
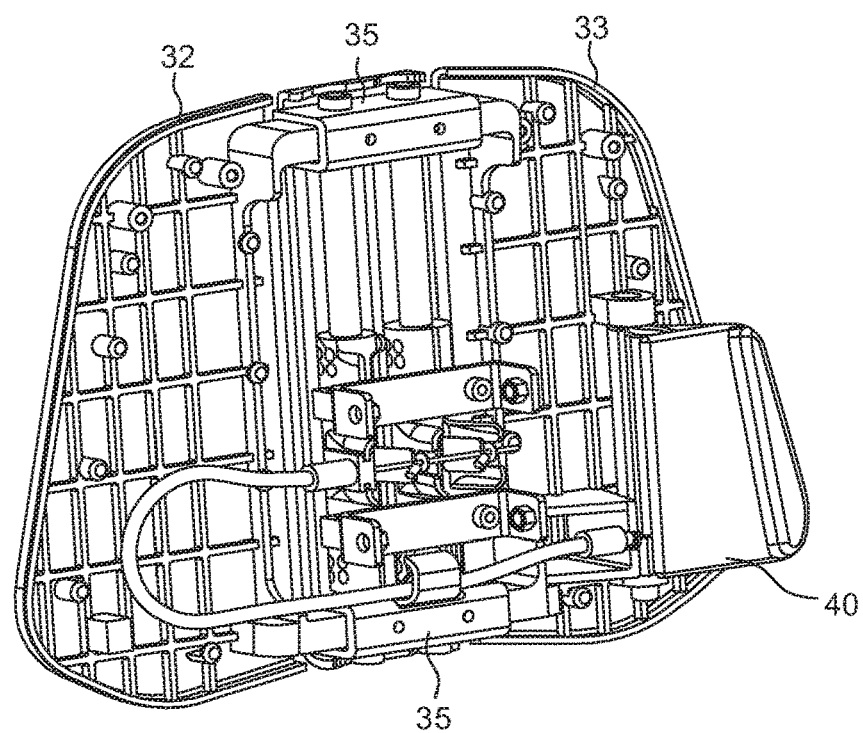
FIG. 9B is a back view of the head restraint in the position of FIG. 9A without the support.

In the rearward direction from the front surface of the head restraint 10, or arranged behind the front surface, are the mechanisms for allowing the head restraint to move vertically, and for the lateral portions 32 and 33 to move angularly, as shown in FIGS. 7B, 8B and 9B. A user interface 40 is preferably mounted on the head restraint 10 to lock and unlock the head restraint 10 in one of the infinite vertical and angular positions. The mechanisms providing the guiding/allowing of the linear and angular movement and the locking/unlocking are described further herein, and with reference to further drawings.

Figure 10:
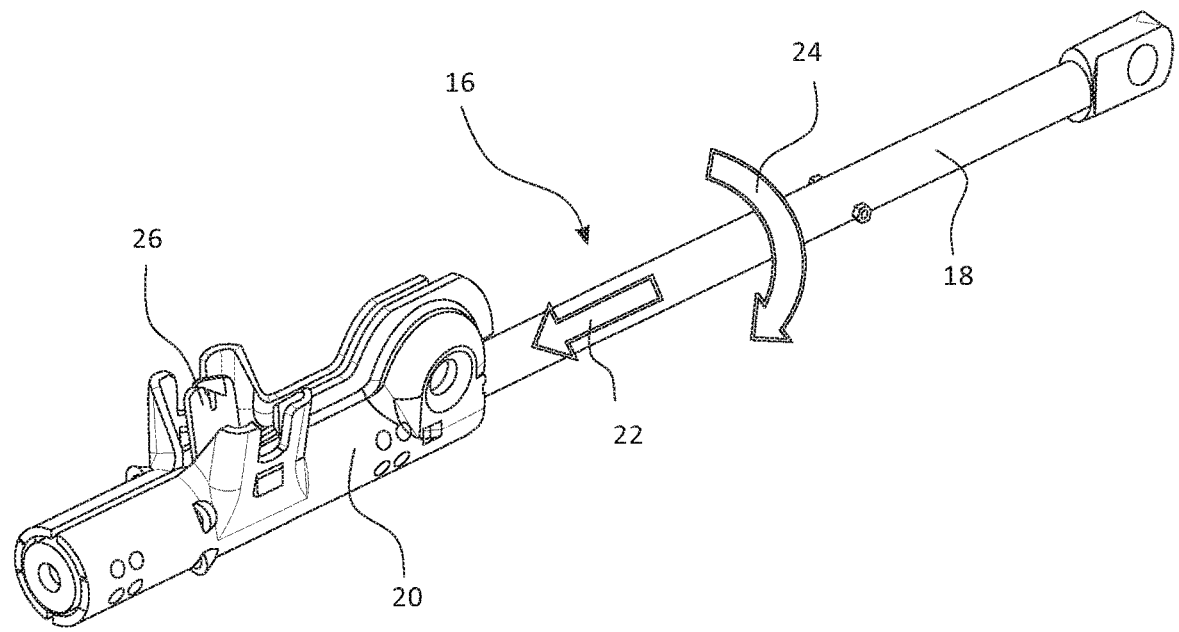
FIG. 10 is a perspective view of the linear locking mechanism in one end position.
Figure 11:
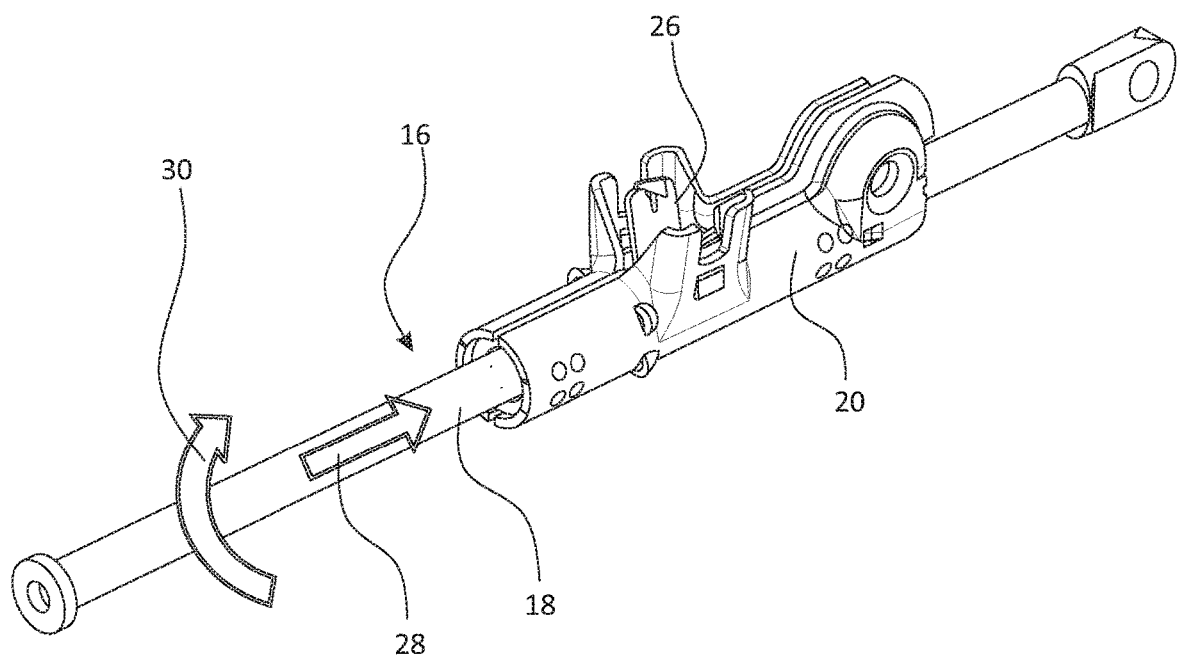
FIG. 11 is a perspective view of the linear locking mechanism in another end position.

One of the mechanisms involved in the head restraint 10, is linear and rotational locking mechanism 16, as especially shown in FIGS. 10 and 11. The linear and rotational locking mechanism 16 includes a shaft, or rod, 18 and a slide, or housing, 20. The slide 20 is selectively movable along the shaft 18 in a linear directions 22, 28 and in rotational directions 24, 30. In FIG. 10, the slide 20 is shown in one linear position on the shaft 18 which is towards the left, and could be the left most position. In FIG. 11, the slide is shown in a more rightwards position with respect to linear direction 22 of the shaft 18. The slide 20 can also selectively rotate about the shaft 18 in the rotational direction 24. This particular linear and rotational locking mechanism 16 is advantageous in that it does not require a separate track and/or rotational bearing to provide and support movement in the linear and rotational directions. The slide 20 and shaft 18 provide these guiding functions the linear and rotational directions in addition to the locking and releasing functions.

Figure 12:
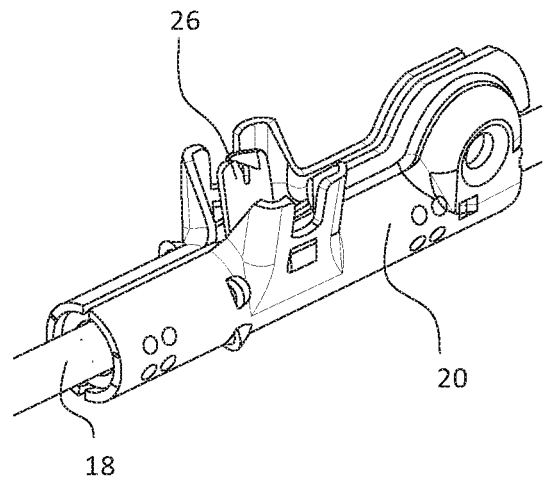
FIG. 12 is a perspective view of the slide of the linear locking mechanism in the locked position.
Figure 13:
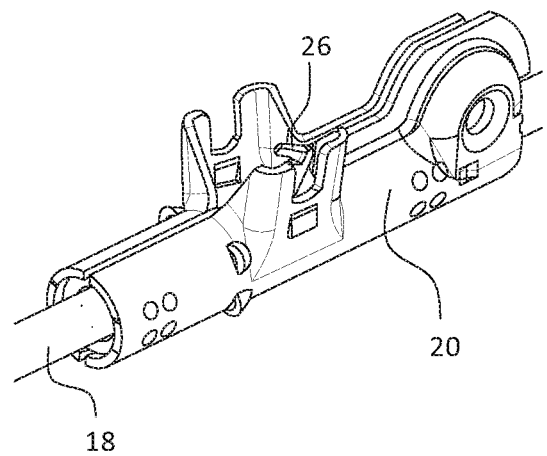
FIG. 13 is a perspective view of the slide of the linear locking mechanism in the released position.

Incorporated into the slide 20 is a selection arm 26, which is movable between two positions, the locked position as shown in FIG. 12, and the release or movable position as shown in FIG. 13. In the release position, the slide 20 is free to move on the shaft 18 in both linear directions 22, 28 and both rotational directions 24, 30. The locked position of the selection arm 26 locks the slide 20 on the shaft 18 in both of the linear directions 22, 28. The locked position of the selection arm 26 also locks the slide 20 on the shaft 18 in one of the rotational directions 24, 30. A linear locking mechanism which locks in both rotational directions 24 and 30 could also be used.

A linear and rotational locking mechanism 16 which locks in both linear directions 16, 28, and one of the rotational directions 24, 30 is preferred because such a linear locking mechanism 16 is simpler in design, more rugged in construction, and more economical to manufacture than many other linear locking mechanisms which lock in both linear and rotational directions. These linear and rotational locking mechanisms are often used in other fields for just their linear locking features. The characteristic of also selectively locking and unlocking in only one rotational direction is usually ignored, and considered unimportant.

A preferred linear and rotational locking mechanism is manufactured by Porter Systems LLC having an address at 28700 Cabot Drive, Suite 800 Novi, Mich. 48377. This locking and rotational mechanism offers infinite adjustment because it uses the forces created from two torsional springs working in tandem with two bushings to lock on a solid shaft. These linear and rotational locking devices lock in only one direction rotationally because of the orientation of the torsional springs. These linear locking devices are described further in U.S. Pat. Nos. 5,157,826, 5,794,470, 8,038,220, 5,794,470, 5,441,129, 5,219,045, 5,157,826, 5,150,771, 4,880,084, 4,577,730, 4,457,406, 4,425,987, 4,411,339, 3,874,480, 5,568,843, which are herein incorporated by reference. Other linear and rotational locking mechanism could be used.

Figure 14:
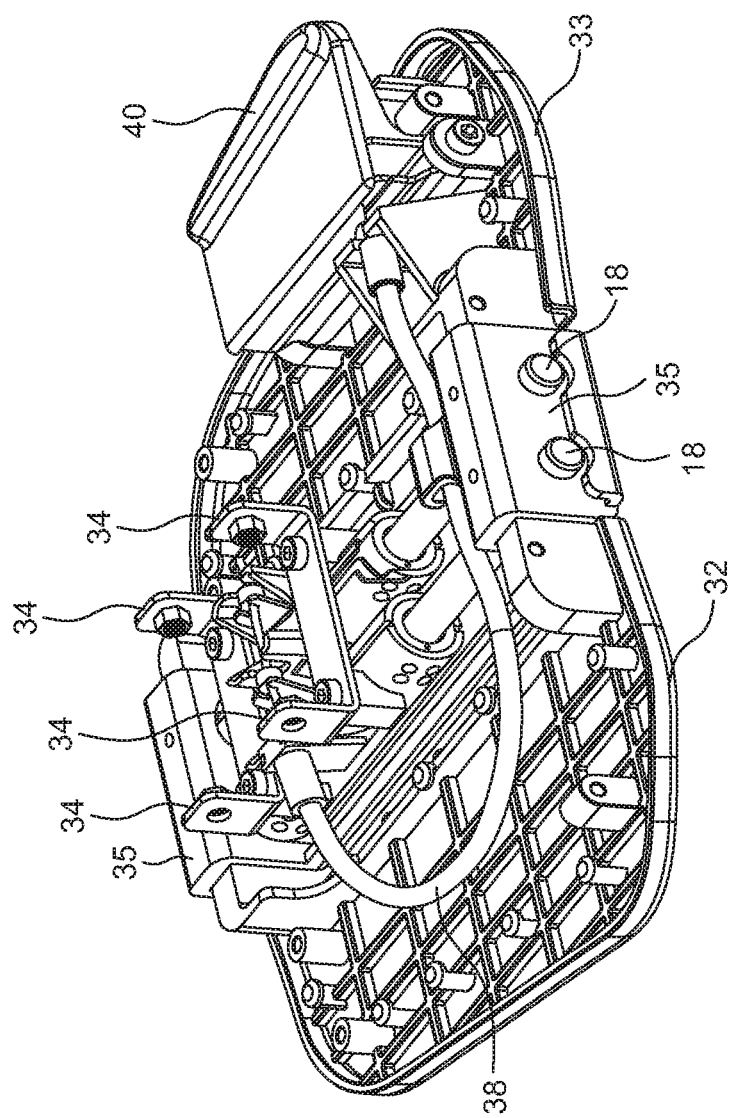
FIG. 14 is a perspective view of two linear locking mechanisms mounted to the back of the front surface of the head restraint.
Figure 15:
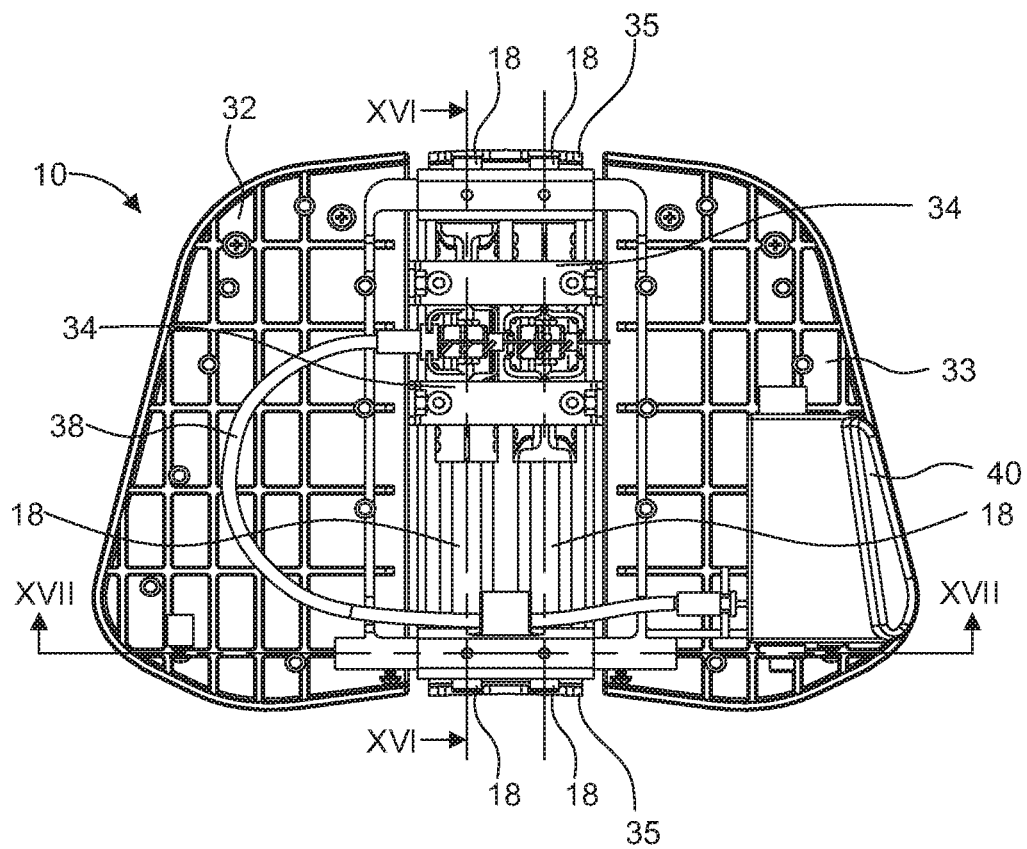
FIG. 15 is a back view of two linear locking mechanisms mounted to the back of the front surface of the head restraint.
Figure 16:
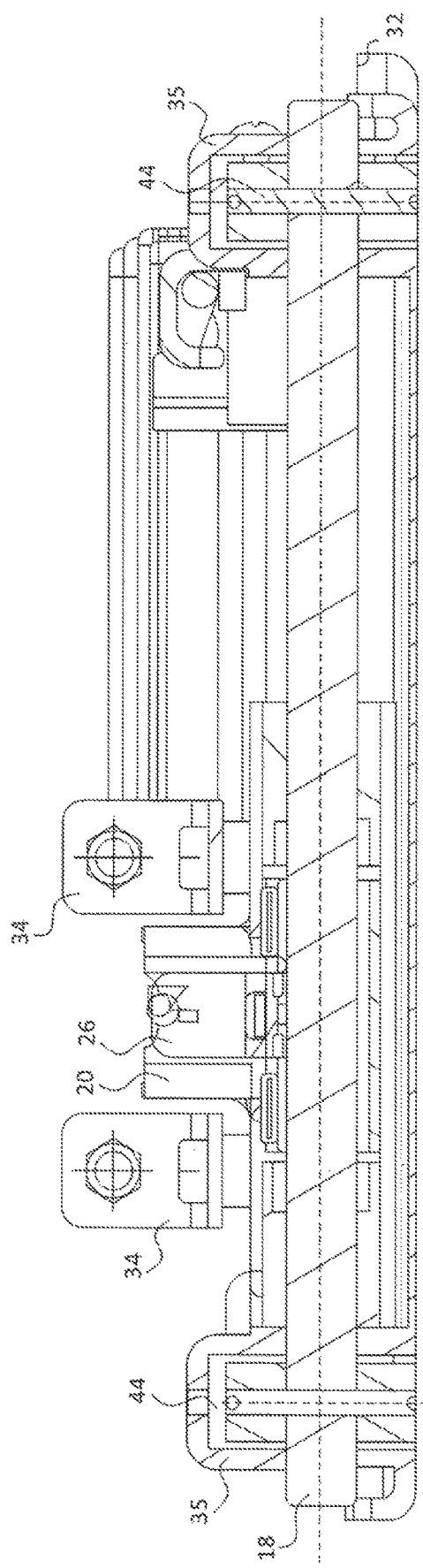
FIG. 16 is a sectional view along the line XVI-XVI in FIG. 15.
Figure 17:
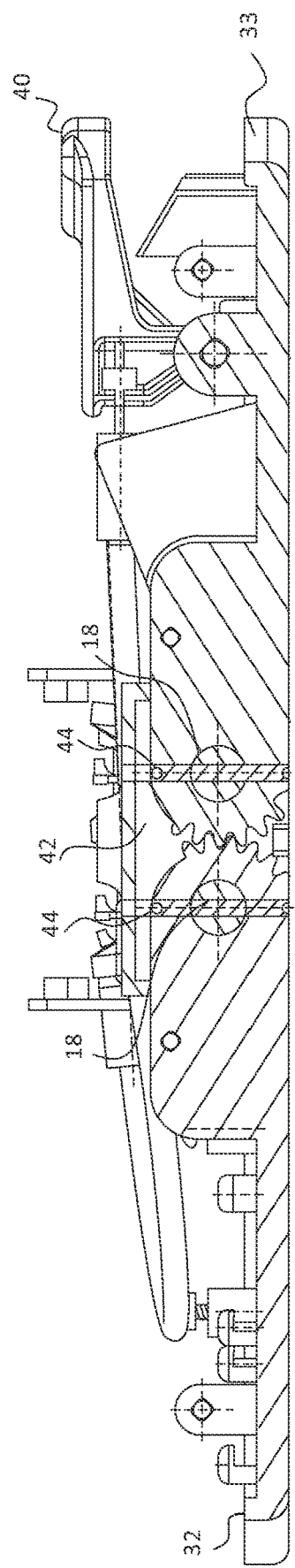
FIG. 17 is a sectional view along the line XVII-XVII in FIG. 15.
Figure 18:
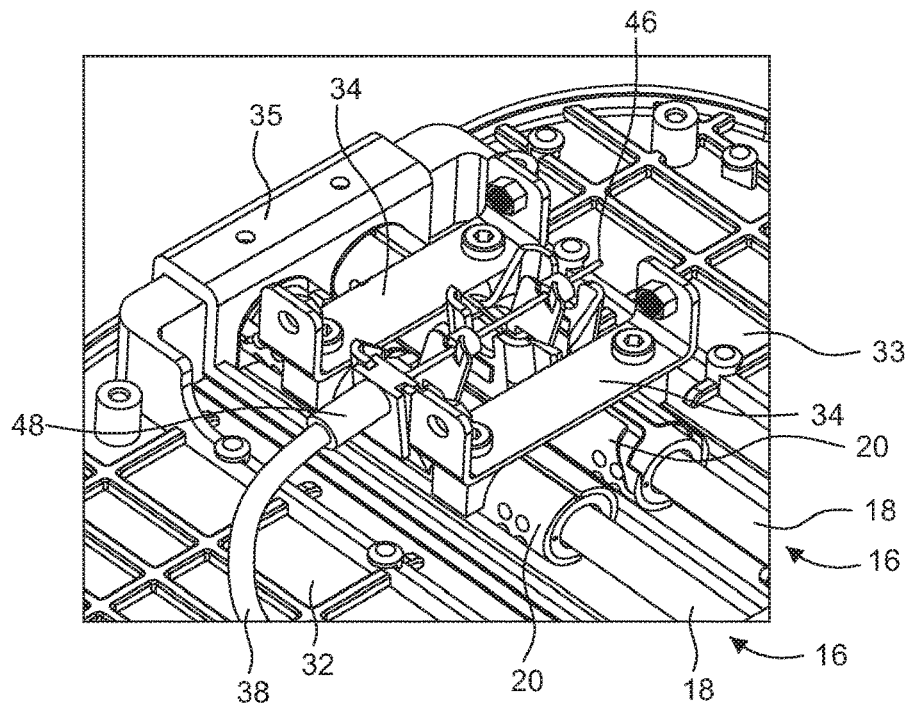
FIG. 18 is a perspective view of the cable release connected to the linear locking mechanisms in the locked state.
Figure 19:
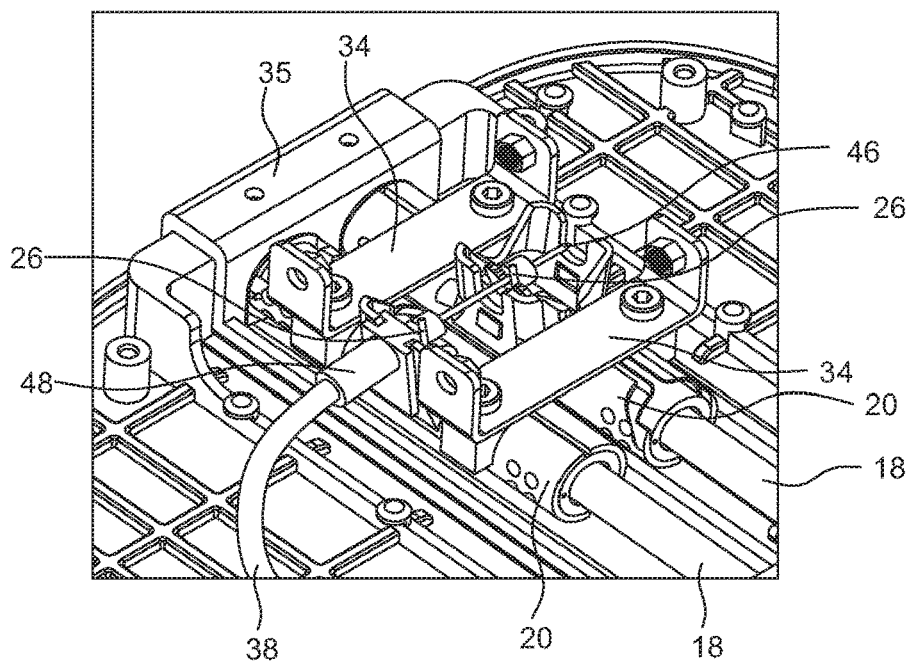
FIG. 19 is a perspective view of the cable release connected to the linear locking mechanisms in the unlocked state.

In one embodiment of the present invention, two linear and rotational locking mechanisms 16 are incorporated into the head restraint 10, as shown in FIG. 14. A bracket, or brackets, form an attachment device 34, and are fixed to the slides 20 of the two linear and rotational locking mechanisms 16. The bracket(s) is (are) then fixed to the support 12 in the installed state of the head restraint 10. The shafts 18 of the linear locking mechanism 16 are fixed to the lateral portions 33 and 32 by anti-rotation features 44 as shown in FIGS. 16 and 17. These anti-rotation features 44 can be set screws, pins etc. that linearly and rotationally fix the respective lateral portion 32, 33 to the respective shaft 18. In this way, the lateral portions 32 and 33 move with the linear and rotational movement of the shafts 18 with respect to the slides 20. The angular movement of the lateral portions 32 and 33 are synchronized with each other by a synchronization connection 42 such as gear teeth. A synchronization connection 42 can be present at the top and bottom of the head restraint 10.

The user interface 40 is preferably a paddle or lever which is mounted on one of the lateral portions 32, 33 and connected to a cable 38 which is connected to the slides 20 and the selection arm 26. When the user interface 40 is moved with respect to the respective lateral portion 32, 33 the cable 38 is activated to move the selection arm 26 relative to the slides 20 and change the position of the selection arm 26 between the release position and the locked position.

Because the linear and rotational locking mechanism 16 may only selectively fix rotation in one direction, two linear locking mechanisms 16 are used in one embodiment. In FIG. 17 for example, the leftmost locking and rotational mechanism can be used to lock the leftmost shaft 18 and a corresponding lateral portion 32 in one rotational direction. Since the lateral portion 32 is synchronized with the opposite lateral portion 33 through the synchronization connection 42, this also prevents a rotation of lateral portion 33 in that one rotational direction. The rightmost locking and rotational mechanism 16 in FIG. 17 can be used to lock the rightmost shaft 18 and the corresponding lateral portion 33 in the other and opposite rotational direction. Then, again through the synchronization connection 42, the lateral portion 32 is also locked in that corresponding rotational direction. One linear and rotational locking mechanism 16 therefore locks the lateral portions 32, 33 in one of the fore and aft directions of the seat, and the other linear and rotational locking mechanism 16 locks the lateral portions 32, 33 in the other of the fore and aft directions of the seat.

The cable 38 has one end connected to the user interface 40, and the other end connected to the slides 20 of the linear and rotational locking mechanisms 16. Preferably the cable 38 is a Bowden type with the inner cable 46 connected to the selection arms 26 and the outer cable 48 connected to the slides 20. When the user interface 40 is activated to pull the inner cable 46, this moves the selection arms 26 relative to the slides 20. Preferably, this puts both slides 20 in the release state at the same time, and allows the slides 20, and correspondingly the lateral portions 32, 33 to move in the linear directions 22, 28, as well as in the rotational directions 24 and 30 at the same time. When the user interface 40 is released, this preferably places the selection arms 26 in the locked position at the same time. The slides 20 as well as the corresponding lateral portions 32, 33 are then locked in the linear directions 22, 28 and the rotational directions 24, 26 at the same time. A single cable 38 can be used to control both linear and rotational locking mechanisms 16, and also control movement of lateral portions 32, 33 in linear directions 22, 28, and rotational directions 24, 30. There can be some flexing of the cable 38 during movement of the head restraint 10, and during operation of the user interface 40. Constraints can be added to the cable 38 to restrict this flexing during the motion of the head restraint 10, and even during motion of the vehicle when the seat 1 is used in a moving vehicle. This can also prevent unintended noise coming from movement of the cable 38.

Figure 20:
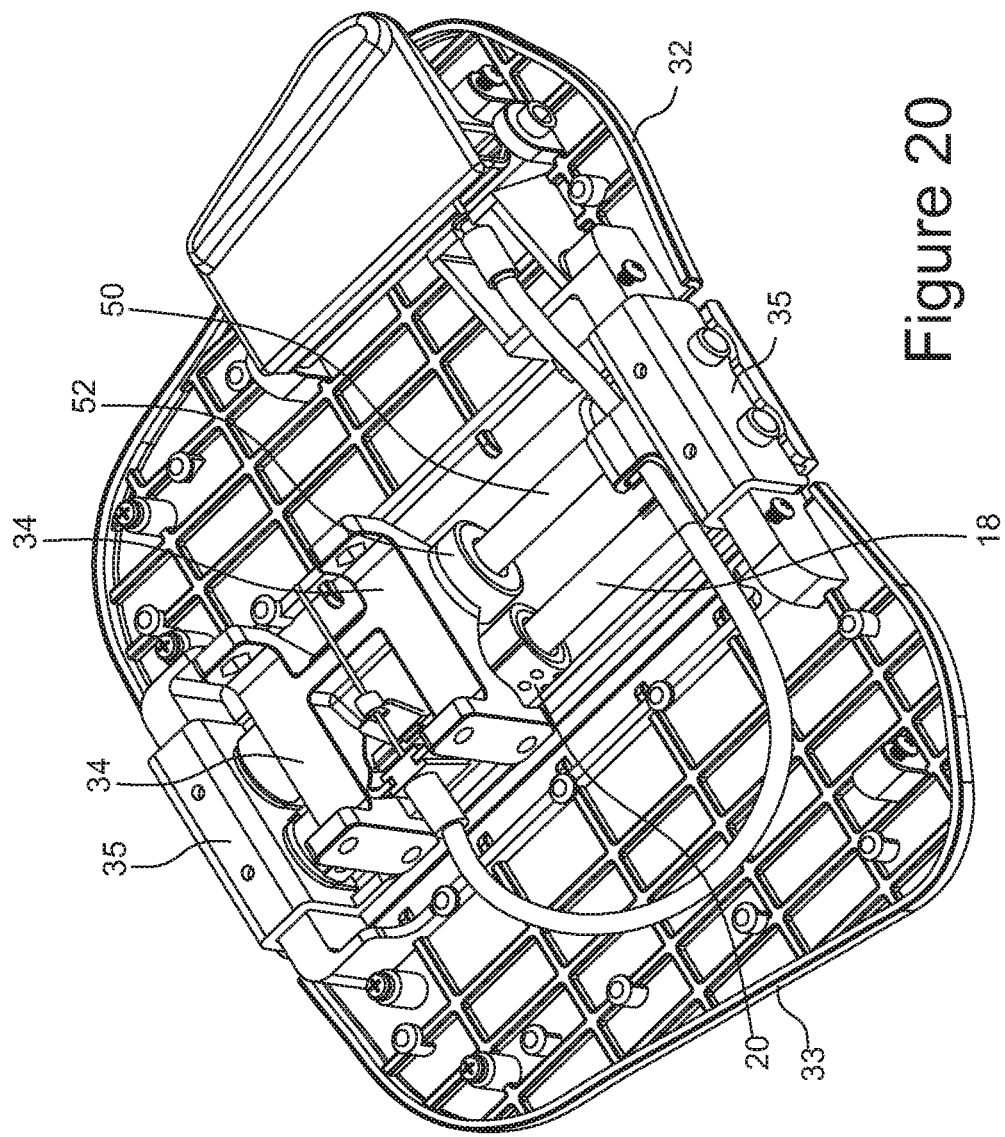
FIG. 20 is a perspective view of an embodiment with a single linear locking mechanism mounted to the back of the front surface of the head restraint in the lower vertical position.
Figure 21:
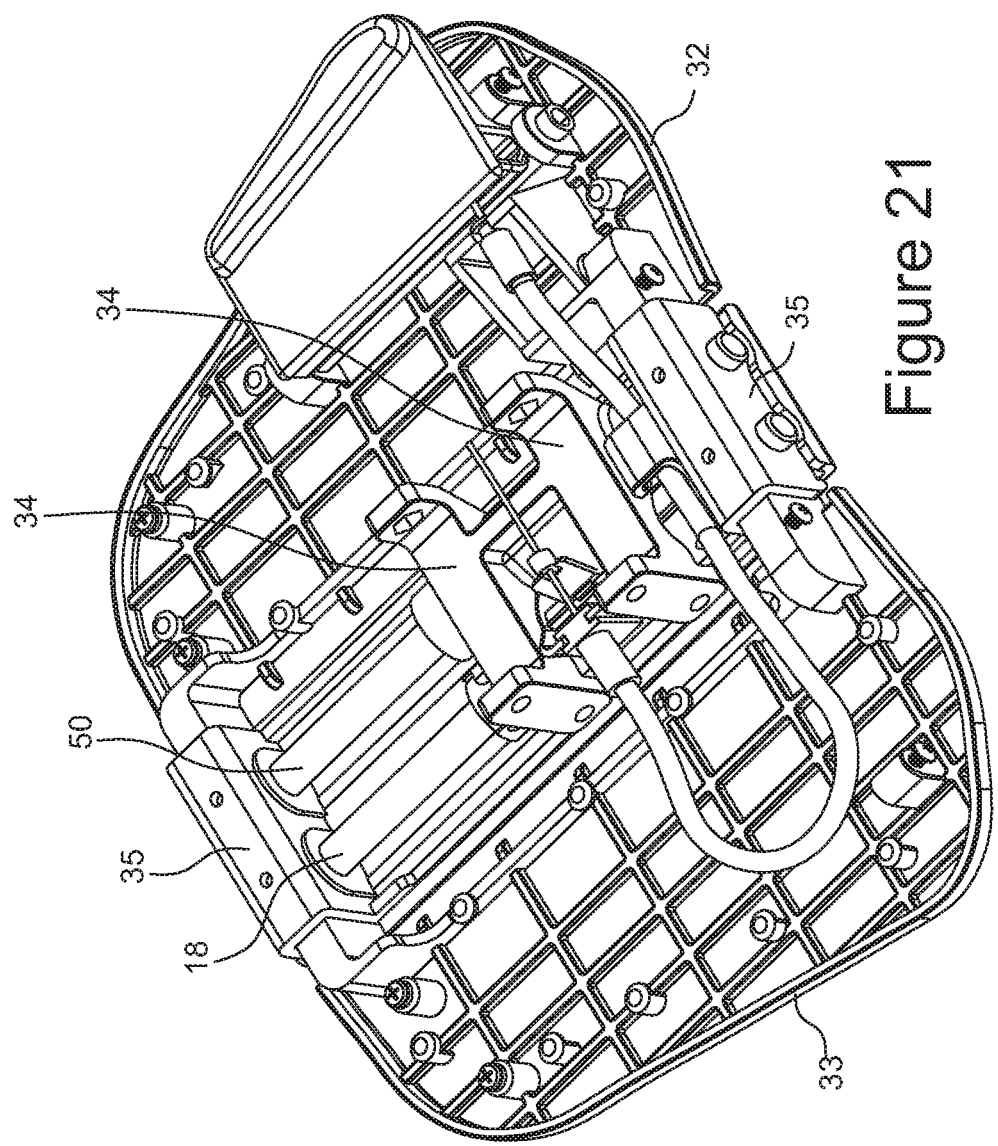
FIG. 21 is a perspective view of the embodiment with a single linear locking mechanism mounted to the back of the front surface of the head restraint in the raised vertical position.

In another preferred embodiment, only a single linear and rotational locking mechanism 16 is used, as shown by example in FIGS. 20 and 21. In this embodiment, a linear and rotational locking mechanism 16 is only used on one of the lateral portions 32, 33. In the example of FIGS. 20 and 21, the linear and rotational locking mechanism 16 is only used on lateral portion 33. The lateral portion 32 is connected to a non-locking shaft 50 and a non-locking slide 52. The non-locking shaft 50 and slide 52 are directly non-locking to each other. Lateral portion 32 is fixed to non-locking shaft 50, and non-locking slide 52 is fixed to bracket 34. For fixing the angular position of lateral portion 32, the single linear locking and rotational mechanism 16 on the lateral portion 33 is used through the synchronization connection 42. Likewise fixing of the linear position is also done by the single linear locking and rotational mechanism 16 on lateral portion 33.

The single linear and rotational locking mechanism 16 only locks, or blocks, the slide 20 and the lateral portion 33 in a single rotational direction. The other lateral portion 32 is correspondingly blocked in a corresponding rotational direction through the synchronization connection 42. The single rotational direction that is blocked in the this embodiment is chosen, so that the lateral portions 32 and 33 are prevented from moving rearward when the linear and rotational locking mechanism 16 is locked. This prevents the occupant's head from moving rearward and provides desired support. Usually there is no force applied to the lateral portions 32, 33 which would cause them to move in the forward direction by themselves. Where there is no force that would move the lateral portions 32, 33 forward unintendedly, a single linear locking mechanism 16 can be used to reduce costs, complexity, weight and space.

The use of a single linear and rotational locking mechanism 16 and its blocking of a single rotational direction, allows the lateral portions 32 and 33 to be angularly adjusted in the other rotational direction without operating the user interface 40. If the unblocked rotational direction allows forward movement of the lateral portions 32, 33, then the occupant can increase the forward position of the head restraint 10 simply by moving either of the lateral portions 32 and 33. This increases the convenience of the head restraint 10.

Pressing the user interface 40 allows the occupant to move the head restraint 10 up/down infinitely, return the lateral portions 32, 33 to the full rearward position, or move them to a more rearward position. The lateral portions 32, 33 can also be spring loaded rearward such as by torsional spring at shafts 18, 50 or an extension spring(s). Other possibilities are possible using known biasing elements. In this way, whenever the user interface 40 is activated, the lateral portions 32, 33 snap rearward.

FIG. 20 shows the slides 20, 52 arranged on the shafts 18, 50 so that the head restraint 10 is in a lower, or lowest position relative to the seat. FIG. 21 shows the slides 20, 52 arranged on the shafts 18, 50 so that the head restraint 10 is in an upper or highest position relative to the seat. In particular, the bottom right portion of the head restraint 10 and center portion 35 in FIGS. 20 and 21 would be the portion arranged closest to the seat back 4, with the support 12 extending from the bracket 34 in a direction down and to the right in FIGS. 20 and 21.

While specific embodiments of the invention have been shown and described in detail to illustrate the application of the principles of the invention, it will be understood that the invention may be embodied otherwise without departing from such principles.

LIST OF REFERENCE CHARACTERS 1 seat
2 seat cushion
4 seat back
10 head restraint
12 support
14 mounts
16 linear locking mechanism
18 shaft
20 slide
22 first linear direction
24 first rotational direction
26 selection arm
28 second linear direction
30 second rotational direction
31 frame
32 first wing
33 second wing
34 bracket
35 center portion
36 center axis
38 cable
40 User interface
42 synchronization connection
44 anti-rotation features
46 inner cable
48 outer cable
50 non-locking shaft
52 non-locking slide

What is claimed is:

1. A head restraint assembly for a seat, the head restraint assembly comprising:
   a linear and rotational locking mechanism with a shaft and a slide, said slide being selectively slidably and rotatably mounted on said shaft, said slide having a locked state which linearly and rotationally fixes said slide on, and with respect to, said shaft, said slide having a release state where said slide is linearly and rotatably movable on said shaft, said slide being fixable in a plurality of linear and rotational positions on said shaft in said locked state;
   an attachment device on said slide of said locking mechanism, said attachment device being adapted to mount to a portion of the seat;

a head restraint portion mounted on said shaft of said locking mechanism, said head restraint portion, said shaft, said slide, and said attachment device being arranged to position said head restraint portion in a head area of an occupant of the seat, said locking mechanism fixing said head restraint portion into a plurality of linear and rotational positions with respect to the seat in the head area of the occupant.

2. A head restraint assembly in accordance with claim 1, wherein:
said slide of said locking mechanism is rotatable around an axial direction of said shaft;
said slide of said locking mechanism is linearly movable along the axial direction of said shaft.

3. A head restraint assembly in accordance with claim 1, wherein:
said attachment device arranges an axial axis of said shaft in a predominately vertical position.

4. A head restraint assembly in accordance with claim 1, wherein:
said attachment device arranges an axial axis of said shaft along a predominately axial position of a seat back of the seat.

5. A head restraint assembly in accordance with claim 1, wherein:
another linear and rotational locking mechanism with another shaft and another slide, said another slide being selectively slidably and rotatably mounted on said another shaft, said another slide having a release state which linearly and rotationally fixes said another slide on, and with respect to, said another shaft, said another slide having a release state where said another slide is linearly and rotatably movable on said another shaft, said another slide being fixable in a plurality of linear and rotational positions on said another shaft in said locked state;
another attachment device on said another slide of said another locking mechanism, said another attachment device being adapted to mount to the portion of the seat;
another head restraint portion mounted on said shaft of said another locking mechanism, said another head restraint portion, said another shaft, said another slide, and said another attachment device being arranged to position said another head restraint portion in the head area of the occupant of the seat, said another locking mechanism fixing said another head restraint portion into a plurality of linear and rotational positions with respect to the seat in the head area of the occupant.

6. A head restraint assembly in accordance with claim 5, further comprising:
a user interface selectively switching said locking mechanism and said another mechanism into said locked state by a single action.

7. A head restraint assembly in accordance with claim 5, further comprising:
a user interface substantially simultaneously and selectively switching said locking mechanism and said another locking mechanism into said locked state.

8. A head restraint assembly in accordance with claim 6, wherein:
said user interface includes a cable performing said single action.

9. A head restraint assembly in accordance with claim 5, further comprising:
a synchronous mechanism connecting said two head restraint portions and synchronizing rotation of said head restraint portion with said another head restraint portion.

10. A head restraint assembly in accordance with claim 1, further comprising:
another head restraint portion pivotally mounted on said attachment device,
a synchronous mechanism connecting said two head restraint portions and synchronizing rotation of said head restraint portion with said another head restraint portion, said another head restraint portion and said attachment device being arranged to position said another head restraint portion in the head area of the occupant of the seat, said locking mechanism and said synchronous mechanism fixing said two head restraint portions into a plurality of linear and rotational positions with respect to the seat in the head area of the occupant.

11. A head restraint assembly in accordance with claim 2, wherein:
said locking mechanism only rotationally fixes said slide to said shaft in a single rotational direction about said axial direction on said shaft in said locked state.

12. A head restraint assembly in accordance with claim 11, wherein:
said single rotational direction is chosen to have said head restrain portion movable toward the head of the occupant regardless of the state of the locking mechanism.

13. A head restraint assembly in accordance with claim 10, wherein:
said locking mechanism only rotationally fixes said slide to said shaft in a single rotational direction about said axial direction on said shaft in said locked state, said single rotational direction is chosen to have said two head restrain portions movable toward the head of the occupant regardless of the state of the locking mechanism.

14. A head restraint assembly in accordance with claim 1, wherein:
said slide is fixable in a continuous plurality of linear and rotational positions on said shaft in said locked state;
said locking mechanism fixing said head restraint portion into a continuous plurality of linear and rotational positions with respect to the seat in the head area of the occupant.

* * * * *